(12) United States Patent
Zhang et al.

(10) Patent No.: US 12,170,565 B2
(45) Date of Patent: *Dec. 17, 2024

(54) SYSTEMS AND METHODS FOR UPLINK CODEBOOK BASED TRANSMISSION

(71) Applicant: APPLE INC., Cupertino, CA (US)

(72) Inventors: Yushu Zhang, Beijing (CN); Chunhai Yao, Beijing (CN); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Wei Zeng, Saratoga, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,857

(22) Filed: Sep. 26, 2023

(65) Prior Publication Data

US 2024/0014878 A1 Jan. 11, 2024

Related U.S. Application Data

(63) Continuation of application No. 17/593,368, filed as application No. PCT/CN2021/103965 on Jul. 1, 2021.

(51) Int. Cl.
*H04W 4/00* (2018.01)
*H04B 7/0404* (2017.01)
(Continued)

(52) U.S. Cl.
CPC ....... *H04B 7/06956* (2023.05); *H04B 7/0404* (2013.01); *H04B 7/0456* (2013.01);
(Continued)

(58) Field of Classification Search
CPC .. H04B 7/06956; H04B 7/0456; H04L 5/0048
See application file for complete search history.

(56) References Cited

U.S. PATENT DOCUMENTS

| 2012/0328039 A1 | 12/2012 | Mazzarese et al. | |
| 2013/0114454 A1* | 5/2013 | Hwang | B65G 51/00 370/252 |

(Continued)

FOREIGN PATENT DOCUMENTS

| CA | 3161255 A1 * | 1/2022 | ........... H04B 7/0404 |
| CN | 109495879 A | 3/2019 | |

(Continued)

OTHER PUBLICATIONS

PCT/CN2021/103965, #International Search Report and Written Opinion, Mar. 28, 2022 00:00:00.0, 9 pages.

(Continued)

*Primary Examiner* — Elisabeth Benoit Magloire
(74) *Attorney, Agent, or Firm* — Dorsey & Whitney LLP (57) ABSTRACT

Precoders are provided for multi-panel uplink (UL) transmission. A codebook may support asymmetric multi-panel UL transmission or super UL transmission where new radio (NR) and long-term evolution (LTE) transmissions may be provided through different antenna panels of a user equipment (UE). Sounding reference signal (SRS) enhancement provides support for multi-panel transmission. The UE transmits an indication of a UE capability based on an antenna structure comprising multiple antenna panels of the UE. Further, the UE determines, at the UE, one or more precoders to use for UL transmissions based at least in part on the UE capability, wherein the one or more precoders include a polarization co-phasing factor, an antenna panel co-phasing factor, and a combining weight for antennas for a same polarization. Additionally, the UE transmits, from the (Continued)

multiple antenna panels, the UL transmissions using the one or more precoders.

14 Claims, 5 Drawing Sheets

(51) Int. Cl.
    *H04B 7/0456*     (2017.01)
    *H04B 7/06*     (2006.01)
    *H04B 17/318*     (2015.01)
    *H04L 5/00*     (2006.01)
    *H04W 24/08*     (2009.01)

(52) U.S. Cl.
    CPC ......... *H04B 7/0469* (2013.01); *H04B 17/328* (2023.05); *H04L 5/0048* (2013.01); *H04W 24/08* (2013.01)

(56) References Cited

U.S. PATENT DOCUMENTS

| | | |
|---|---|---|
| 2015/0016379 A1 | 1/2015 | Nam et al. |
| 2015/0195071 A1 | 7/2015 | Lunttila et al. |
| 2019/0253112 A1 | 8/2019 | Raghavan et al. |
| 2020/0119755 A1 * | 4/2020 | Mahmood ............ H04B 1/0475 |
| 2020/0162133 A1 | 5/2020 | Harrison et al. |
| 2020/0336182 A1 | 10/2020 | Faxér et al. |
| 2021/0136694 A1 * | 5/2021 | Gao .................... H04W 52/245 |
| 2021/0218445 A1 | 7/2021 | Qiang et al. |
| 2022/0174592 A1 * | 6/2022 | Zhang ................. H04B 7/0693 |
| 2023/0091465 A1 | 3/2023 | Yuan et al. |

FOREIGN PATENT DOCUMENTS

| | | | | |
|---|---|---|---|---|
| CN | 110350957 A | 10/2019 | | |
| CN | 115462151 A | 12/2022 | | |
| EP | 3800946 A1 * | 4/2021 | .......... | H04W 52/146 |
| WO | 2018127426 A1 | 7/2018 | | |
| WO | 2019020050 A1 | 1/2019 | | |
| WO | 2019216733 A1 | 11/2019 | | |
| WO | 2020146494 A1 | 7/2020 | | |

OTHER PUBLICATIONS

U.S. Appl. No. 17/593,368, Non-Final Office Action, Mar. 27, 2024, 13 pages.
U.S. Appl. No. 17/593,368, Notice of Allowance, Jul. 18, 2024, 6 pages.

* cited by examiner

SYSTEMS AND METHODS FOR UPLINK CODEBOOK BASED TRANSMISSION

TECHNICAL FIELD

This application relates generally to wireless communication systems, including techniques for uplink transmission.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

In certain systems, for codebook-based uplink transmission, the codebook is predefined (e.g., see 3GPP Technical Specification (TS) 38.211 section 6.3.1.5). A base station may choose the precoder for uplink transmission and may signal the selected precoder to the UE. For example, a gNB or other base station may indicate the precoder to the UE based on a field "precoding information and number of layers" in downlink control information (DCI) Format 0_1 and/or DCI Format 0_2 for dynamic grant based transmission. As another example, the base station may configure the precoder by radio resource configuration (RRC) for configured-grant based transmission. Different codebooks may be selected based on different number of ports.

The precoder maps one or more layers at the UE to one or more antenna ports. A layer may refer to a multiple-input multiple-output (MIMO) layer (e.g., a data stream). Precoding may exploit transmit diversity and increase throughput in multi-antenna wireless communications by applying weighting to the information stream (e.g., layer). For example, information bits may be encoded to produce one or more codewords. After scrambling and modulation, each codeword may be mapped to one or more layers (e.g., streams). The number of transmit streams is referred to as a transmission rank. A transmission rank can be defined as the spatial multiplexing order. The transmission rank can be optimally chosen for a given channel, upon consideration of transmit power and various channel characteristics. Precoding applies precoders to map each layer to one or more UE antenna ports (e.g., logical channel ports that can be spread across a single or multiple antennas). For each transmit stream, the precoder is a beamforming vector that includes a set of weights (one for each antenna) that are multiplied with the transmitted symbol prior to transmission. The precoded layers can then be mapped to resource elements (REs) and the signal may be generated and transmitted via the corresponding antenna ports. A precoder may refer to a precoding matrix.

Figure 1:
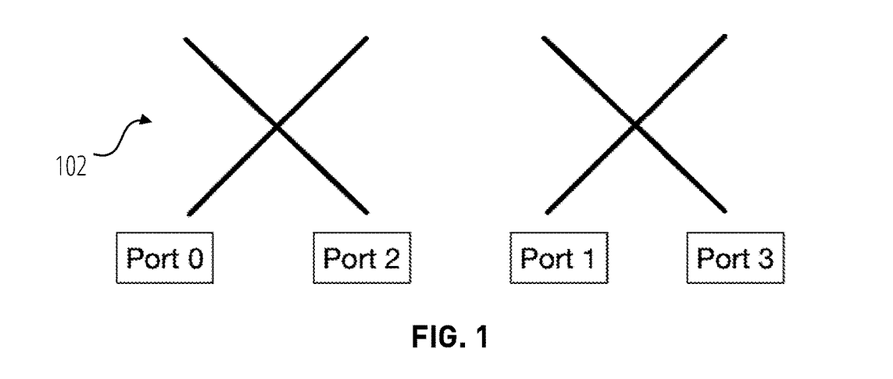
FIG. 1 illustrates an example single panel antenna array with cross-polarized antenna elements in accordance with one embodiment.

In certain systems, the precoders may be designed for single panel uplink transmission. For example, FIG. 1 illustrates an example single panel antenna array with cross-polarized antenna elements 102. The 3GPP Release-15 (Rel-15) codebook, for example, supports 2 port transmission and 4 port transmission and is designed based on single panel transmission with the assumption of dual-polarization antenna structure. As shown in FIG. 1, an antenna structure assumption for codebook design maps antennas with a first polarization first and then antennas with a second polarization second (e.g., Port 0 and Port 1 correspond to the first polarization and Port 2 and Port 3 correspond to the second polarization).

For a UE that supports both LTE and NR, when the load of LTE is small, the UE may lend some antennas for LTE communication to NR, which can be called a "super UL" transmission. Example codebooks for super UL transmission include the following cases.

Example case 1: 1 port from LTE+2 port NR, which would use a 3 port codebook.
Example case 2: 1 port from LTE+4 port NR, which would use a 5 port codebook.
Example case 3: 2 port from LTE+4 port NR, which would use a 6 port codebook.
Example case 4: 4 port from LTE+4 port NR, which would use an 8 port codebook.

As an extension of the above example cases, there may be a case with more ports from LTE than NR (e.g., 2 port from LTE and 1 port from NR).

Further, NR may support simultaneous uplink multi-panel transmission (e.g., in 3GPP Release-18 (Rel-18)). Different panels may include different numbers of antennas (e.g., some panels with 2 ports and some panels with 1 port, which may require 3 port codebook). In certain implementations, an uplink signal may be transmitted from 2 or 3 panels.

Thus, certain embodiments disclosed herein provide precoders for multi-panel uplink (UL) transmission. A codebook, for example, may support asymmetric multi-panel UL transmission or super UL transmission where NR and LTE transmissions may be provided through different antenna panels of a UE. In addition, or in other embodiments, sounding reference signal (SRS) enhancement is provided to support multi-panel transmission.

A. Example Antenna Indexing

Figure 2A:
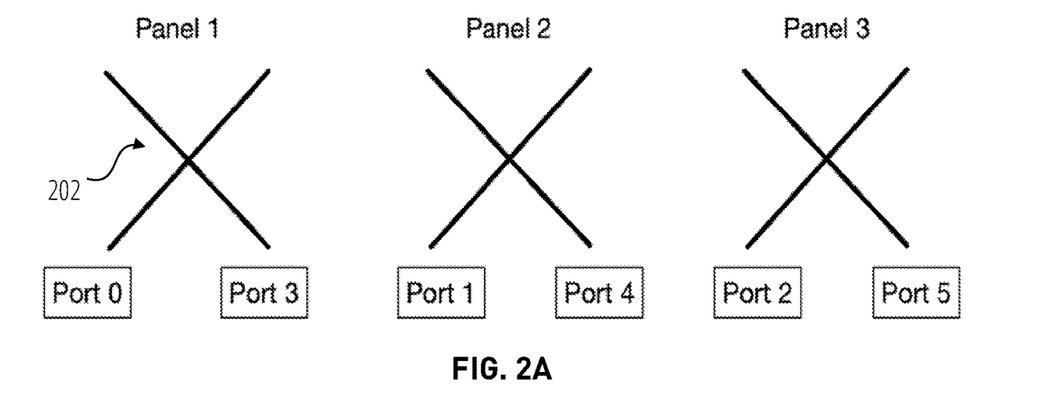
FIG. 2A illustrates a multi-panel antenna array with cross-polarized antenna elements for a first example port to antenna mapping in accordance with one embodiment.

As discussed in certain embodiments herein, the codebook for multi-panel transmission may be based on the different port to antenna assumptions, i.e. an antenna indexing assumption. In a first example (Assumption 1), the port is mapped to the antenna from one polarization first, and then the port is indexed from port(s) within a panel first. For an example of Assumption 1, FIG. 2A illustrates a multi-panel antenna array with cross-polarized antenna elements 202 in three antenna panels (shown as Panel 1, Panel 2, and Panel 3) in accordance with one embodiment. As shown, Port 0 in Panel 1, Port 1 in Panel 2, and Port 2 in Panel 3 are mapped first and may correspond to a first polarization. Then, Port 3 in Panel 1, Port 4 in Panel 2, and Port 5 in Panel 3 are mapped and may correspond to a second polarization.

Figure 2B:
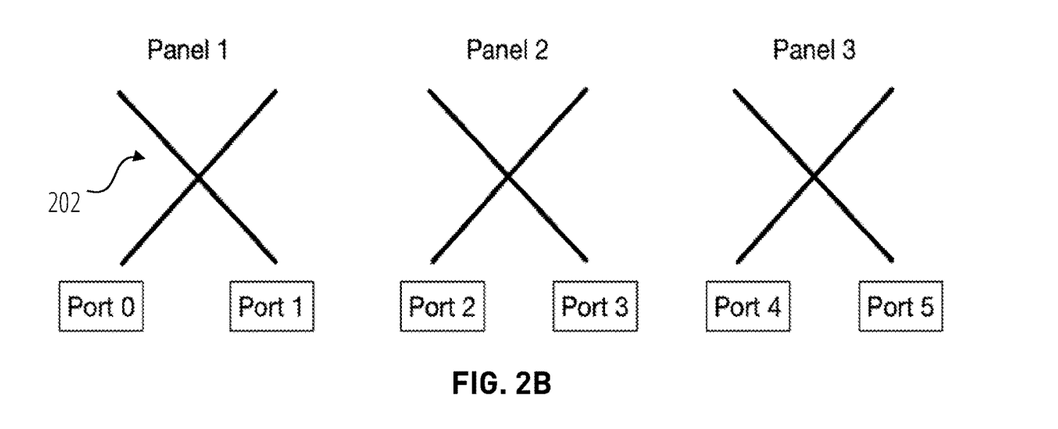
FIG. 2B illustrates a multi-panel antenna array with cross-polarized antenna elements for a second example port to antenna mapping in accordance with one embodiment.

In a second example (Assumption 2), the port is mapped to the antenna from one panel first, and then within a panel the port is indexed from one polarization first. For an example of Assumption 2, FIG. 2B illustrates a multi-panel antenna array with cross-polarized antenna elements 202 in Panel 1, Panel 2 and Panel 3 in accordance with one embodiment. As shown, Port 0 and Port 1 are first mapped to Panel 1, where Port 0 may correspond to a first polarization and Port 1 may correspond to a second polarization. Then, Port 2 and Port 3 are mapped to Panel 2, where Port 2 corresponds to the first polarization and Port 3 corresponds to the second polarization. Then, Port 4 and Port 5 are mapped to Panel 3, where Port 4 corresponds to the first polarization and Port 5 corresponds to the second polarization.

B. Example Codebook Design

In certain embodiments, the codebook design is based on polarization co-phasing, antenna panel co-phasing, and combining weights for antennas with the same polarization. It may be possible, for example, to maintain a relative phase of transmit chains of an antenna array. In this case, the UE is able to transmit the same modulation symbol over multiple transmit chains with individual gain and/or phase per transmit chain to form a beam over the corresponding antenna array. The transmission of a common modulation symbol or signal on multiple antenna elements with controlled phase may be referred to as coherent transmission.

In other implementations, the relative phase of a subset of the transmit chains is well controlled, but not over all transmit chains. One possible example is multi-panel operation where phase is well controlled among transmit chains within a panel, but phase between panels is not well controlled. Such transmissions may be referred to as partially-coherent.

In still other implementations, the relative phase of the transmit chains may not be well controlled, and coherent transmission may not be used. In such implementations, it may still be possible for the UE to transmit on one of the transmit chains at a time, or to transmit different modulation symbols on the transmit chains. In the latter case, the modulation symbols on each transmit chain may form a spatially multiplexed, or MIMO, layer. Such transmissions may be referred to as non-coherent transmission.

Referring to FIG. 2A, for example, polarization co-phasing may be considered between Port 0 and Port 1 within Panel 1, between Port 1 and Port 4 in Panel 1, and between Port 2 and Port 5 in Panel 3. Further, co-phasing may be considered between Panel 1, Panel 2, and Panel 3. In addition, antenna combining weights may be considered for Port 0, Port 1, and Port 2 in a first polarization direct, and between Port 3, Port 4, and Port 5 in a second polarization direction.

In certain embodiments, a polarization co-phasing factor $\phi_n = e^{j\pi n/2}$ between two orthogonal polarizations, wherein n is an index or value corresponding to the polarization co-phasing factor. By way of example only, and not by limitation, for rank 1 precoding, n may be an integer selected from the group comprising 0, 1, 2, or 3. In a first option (Option 1-1), the polarization co-phasing for all panels is the same. In a second option (Option 1-2), the polarization co-phasing for a subset of the panels is the same. In a third option (Option 1-3), the polarization co-phasing for all panels is different.

In certain embodiments, an antenna panel co-phasing factor $a_p = e^{j\pi p/2}$, wherein p is an index or value corresponding to the antenna co-phasing factor. In a first option (Option 2-1), the antenna panel co-phasing for all panels is the same. In a second option (Option 2-2), the antenna panel co-phasing for a subset of the panels is the same. In a third option (Option 2-3), the antenna panel co-phasing for all panels is different.

In certain embodiments, where there are $N_k$ ports in panel k and where there are K antenna panels, the combining weight for antennas with the same polarization within a panel is given by $u_m^k=[1,e^{2\pi m/(O\times N_k)}, \ldots, e^{2\pi(N_k-1)/(O\times N_k)}]^T$, wherein m is an index or value corresponding to the combining weight, O is an oversampling factor, and T is a transpose operation. In a first option (Option 3-1), the combining weight for all panels is the same. In a second option (Option 3-2), the combining weight for a subset of the panels is the same. In a third option (Option 3-3), the combining weight for all panels is different.

In one embodiment, when the polarization co-phasing for all antenna panels is the same and the antenna panel co-phasing for all panels are is same and the combining weight for all panels is the same (i.e., Option 1-1+Option 2-1+Option 3-1), and when ports are mapped to the antenna from one polarization first and then the ports are indexed from port(s) within a panel first (Assumption 1), a rank 1 precoder w may be generated as $w_{p,m,n}=[u_{m,1}, a_p u_{m,2}, \ldots, a_p u_{m,K}, \phi_n u_{m,1}, a_p \phi_n u_{m,2}, \ldots, a_p \phi_n u_{m,K}]^T$.

In another embodiment, when the polarization co-phasing for all antenna panels is the same and the antenna panel co-phasing for all panels are is same and the combining weight for all panels is the same (i.e., Option 1-1+Option 2-1+Option 3-1), and when ports are mapped to the antenna from one panel first and then within a panel the ports are indexed from one polarization first (Assumption 2), a rank 1 precoder w may be generated as $w_{p,m,n}=[u_{m,1}, \phi_n u_{m,1}, a_p u_{m,2}, a_p \phi_n u_{m,2} \ldots, a_p u_{m,K}, a_p \phi_n u_{m,K}]^T$.

In another embodiment, when the polarization co-phasing is different for all antenna panels and the antenna panel co-phasing is different for all panels and the combining weight is different for all panels (i.e., Option 1-3+Option 2-3+Option 3-3), and when ports are mapped to the antenna from one polarization first and then the ports are indexed from port(s) within a panel first (Assumption 1), a rank 1 precoder w may be generated as $w_{m_1,n_1,m_2,n_2,p_2, \ldots, m_K,n_K,p_K}=[u_{m_1,1}, a_{p_2}u_{m_2,2}, \ldots, a_{p_K}u_{m_K,K}, \phi_{n_1}u_{m_1,1}, a_{p_2}\phi_{n_2}u_{m_2,2}, \ldots, a_{p_K}\phi_{n_K}u_{m_K,K}]^T$. In certain such embodiments, one or more of m_k, n_k, and/or p_k may be the same for two or more panels.

In another embodiment, when the polarization co-phasing is different for all antenna panels and the antenna panel co-phasing is different for all panels and the combining weight is different for all panels (i.e., Option 1-3+Option 2-3+Option 3-3), and when ports are mapped to the antenna from one panel first and then within a panel the ports are indexed from one polarization first (Assumption 2), a rank 1 precoder w may be generated as $w_{m_1,n_1,m_2,n_2,p_2, \ldots, m_K,n_K,p_K}=[u_{m_1,1}, \phi_{n_1}u_{m_1,1}, a_{p_2}u_{m_2,2}, a_{p_2}\phi_{n_2}u_{m_2,2} \ldots, a_{p_K}u_{m_K,K}, a_{p_K}\phi_{n_K}u_{m_K,K}]^T$. In certain such embodiments, one or more of m_k, n_k, and/or p_k may be the same for two or more panels.

Certain UEs may not be able to support coherent transmission for some panels or across some panels. Thus, in certain embodiments, additional precoders may be generated based on the rank 1 precoder with some elements corresponding to some panels or some ports within panels set to zero (0). For example, for a 2 port+1 port case, some non-coherent precoders can be added as {[1 0 0]T, [0 1 0]T, [0 0 1]T}. Further, some partial-coherent precoders can be added as {[1 1 0]T, [1 0 1]T, [0 1 1]T}, and based on certain port indexing rule, only some of the ports can be used for transmission for a layer. For example, only partial coherent precoder {[1 1 0]T, [1 j 0]T, [1−1 0]T, [1 −j 0]T} can be defined in additional to non-coherent based precoders, where the first two ports are for the first panel and the last port is for the second panel.

In certain embodiments, the final rank 1 precoder is normalized.

In certain embodiments, the rank 2 precoder is generated based on the rank 1 precoder. The first layer may be generated based on w, and the second layer can be generated based on w'. For example, the rank 2 precoder w' may be generated based on the rank 1 precoder w by changing the polarization co-phasing factor $\phi_n$ to $-\phi_n$.

In addition, or in other embodiments, precoders with a rank greater than 2 (rank>2 precoders) may be generated based on different values of m, n, and p for every two layers.

In certain embodiments, non-coherent and/or partial coherent precoders for rank>1 may be generated based on the panel(s) and/or port(s) selected for each layer. In a non-coherent case, the UE may use a rank 1 precoder [1 0 0]T and a rank 2 precoder [0 1 0]T. In one example (using Option 1-1+Option 2-1+Option 3-1 and Assumption 1 discussed above), for a rank 2 precoder, the precoder for the first layer may be generated as follows if UE does not support coherent transmission across polarizations: $w_{p,m}=[u_{m,1}, a_p u_{m,2}, \ldots, a_p u_{m,K}, 0, \ldots, 0]^T$. The precoder for the second layer may be generated as follows: $w_{p',m'}=[0, 0, \ldots, 0, u_{m',1}, a'_p u_{m',2}, \ldots, a'_p u_{m',K}]$T. In certain such embodiments, the final precoder is normalized.

C. Control Signaling

In certain embodiments, the codebook structure is determined by the antenna and antenna structure. Accordingly, the UE may report the preferred codebook or codebook subset by UE capability to the base station. For example, the UE may report whether the co-phasing for all panels should be the same, whether the co-phasing between polarizations for all panels should be the same, whether the antenna combining weight for the elements with the same polarization should be the same, and/or whether the UE supports coherent/non-coherent/partial coherent transmission for each panel and across panels. In certain such embodiments, higher layer signaling (e.g., RRC or media access control (MAC) control element (CE) signaling) may be introduced to enable corresponding codebook or codebook subset based on the UE capability.

D. SRS Enhancement

In certain embodiments, SRS enhancement to support multi-panel transmission is provided by transmitting SRS from multiple panels. For example, new SRS transmission may be introduced, e.g. {3, 5, 6, 7, 8} ports for SRS transmission. The pathloss for power control for the SRS can be based on the reference signal received power (RSRP) measured from all the UE's antenna panels to be used to transmit SRS. The pathloss, for example, can be calculated based on an average, minimal, and/or maximum RSRP measured across the antenna panels. In certain embodiments, the base station (e.g., gNB) may indicate more than one spatial relation or transmission configuration indicator (TCI) for an SRS resource to provide beam indication per panel.

In other embodiments, SRS enhancement to support multi-panel transmission is provided by transmitting each SRS from a single antenna panel of the UE. The base station may indicate more than one SRS resource indicator (SRI) in DCI or RRC signaling to enable the multi-panel transmission. The number of transmission ports for codebook selection is based on the total number of SRS ports indicated. In one embodiment, the base station indicates only one transmission rank indication (TRI) or transmission precoding matrix indicator (TPMI) in DCI or RRC signaling for precoder selection. In one embodiment, the UE determines power control parameters for the PUSCH based on the indicated SRIs. For example, the base station may configure the mapping between indicated SRIs and power control parameters. In another embodiment, the base station configures the power control parameters for the PUSCH by RRC signaling. In yet another embodiment, the base station configures the power control parameters for the PUSCH by the beam indication signaling for PUSCH (e.g., TCI indication).

An SRS is a reference signal used to measure an uplink channel. A base station may measure an uplink channel based on an SRS sent by a UE to determine channel conditions or quality of the uplink channel and schedule uplink resources. In some systems with channel reciprocity, the base station may estimate channel state information (CSI) of a downlink channel by using the CSI of the uplink channel obtained by measuring the uplink channel to schedule downlink resources. However, if the number of uplink antennas configured for the UE is less than the number of downlink antennas, the UE may need to switch a plurality of antennas to send a plurality of SRSs so that the base station obtains CSI of a plurality of downlink channels.

In NR or 5G networks, a UE may support antenna switching (e.g., also referred to as antenna port switching or port switching) to transmit SRS for downlink channel estimation. The UE may have a different number of transmit (Tx) antenna ports (N_tx) and receive (Rx) antenna ports (N_rx), where N_tx may typically be lower than N_rx. To measure DL CSI based on UL channel, the base station may trigger multiple SRS resources to construct a DL channel. Certain systems support several types of antenna switching as "xTyR," where "T" represents Tx antenna ports or Tx chains, "R" represents Rx antenna ports or Rx chains, x={1, 2, 4} (the number of Tx antenna ports/chains), and y={2, 4} (the number of Rx antenna ports/chains). For example, for a 2T4R UE with 2 Tx chains and 4 Rx chains, the UE may transmit an SRS twice on each of the 2 Tx chains (e.g., using antenna switching) to sound the channels for each of the 4 Rx chains. Similarly, for a 1T4R UE with 1 Tx chain and 4 Rx chains, the UE may transmit SRS four times on the single Tx chain (e.g., using antenna switching) to sound the channels for each of the 4 Rx chains. Skilled persons will recognize from the disclosure herein that other values of x and y may be used. For example, in NR or 5G networks, y may be increased to include 8.

In certain systems for antenna switching, configurations such as {3T4R, 3T6R, 3T8R, 5T6R, 5T8R, 6T8R} may be supported (e.g., see 3GPP TS 38.214 section 6.2.1.2). In certain embodiments, the number of SRS resources can be configured as ceil(y/x) for xTyR, where one particular SRS may be configured with more or less ports. Here, "ceil( )" is a mathematical function that rounds a number up the next largest whole number or integer. In one example, for 3T8R, three SRS resources can be configured with the number of port configured as {3, 3, 2} (i.e., the first two SRS resources are configured with 3 ports and the third SRS resource is configured with 2 ports). Thus, with transmissions using the three SRS resources in this example, the base station can determine the information for the eight receiving ports.

In one embodiment, for super UL transmission, SRS switching is in the normal uplink slot only. In certain embodiments, however, it may also be in the switched slot as an extension. The switched slot is a special slot that may be used for UL/DL switching.

In one embodiment, for Evolved Universal Terrestrial Radio Access (E-UTRA)-NR Dual Connectivity (EN-DC), SRS carrier switching may be in the LTE side or in the NR side.

E. Example Methods and Devices

Figure 3:
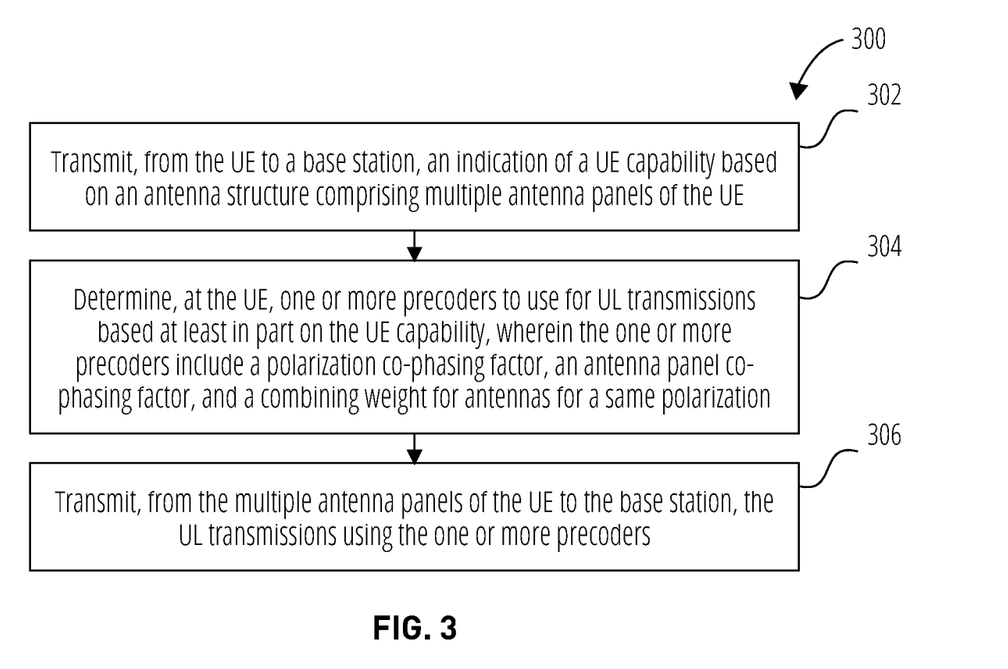
FIG. 3 is a flowchart of a method for multi-panel UL codebook based transmission by a UE in accordance with one embodiment.

FIG. 3 is a flowchart of a method 300 for multi-panel UL codebook based transmission by a UE according to one embodiment. In block 302, the method 300 includes transmitting, from the UE to a base station, an indication of a UE capability based on an antenna structure comprising multiple antenna panels of the UE. In block 304, the method 300 includes determining, at the UE, one or more precoders to use for UL transmissions based at least in part on the UE capability. The one or more precoders include a polarization co-phasing factor, an antenna panel co-phasing factor, and a combining weight for antennas for a same polarization. In block 306, the method 300 includes transmitting, from the multiple antenna panels of the UE to the base station, the UL transmissions using the one or more precoders.

In one embodiment of the method 300, the indication of the UE capability comprises one or more of a preference for a co-phasing for the multiple antenna panels to be the same, a preference for the co-phasing between polarizations for the multiple antenna panels to be the same, and a preference for the combining weight multiple antenna panels to be the same.

In one embodiment of the method 300, the indication of the UE capability indicates whether the UE supports coherent transmission, non-coherent transmission, or partial coherent transmission for each of the multiple antenna panels and across the multiple antenna panels.

In one embodiment, the method 300 further comprises decoding, by the UE, higher layer signaling from the base station enabling a codebook or codebook subset based on the UE capability. The higher layer signaling may comprise radio resource control (RRC) or media access control (MAC) control element (CE) signaling.

In one embodiment of the method 300, the polarization co-phasing factor comprises $\phi_n = e^{j\pi n/2}$ between two orthogonal polarizations, where n is an index corresponding to the polarization co-phasing factor. The antenna panel co-phasing factor comprises $a_p = e^{j\pi p/2}$, where p is an index or value corresponding to the antenna co-phasing factor. The combining weight comprises $u_m^k = [1, e^{2\pi m/(O \times N_k)}, \ldots, e^{2\pi(N_k-1)/(O \times N_k)}]^T$, where there are $N_k$ ports in panel k for K antenna panels, m is an index corresponding to the combining weight, O is an oversampling factor, and T is a transpose operation. In certain such embodiments, when the polarization co-phasing factor is the same for the multiple antenna panels, when the antenna panel co-phasing factor is the same for the multiple antenna panels, and when the combining weight is the same for the multiple antenna panels; and when the $N_k$ ports are mapped to corresponding antenna elements from one polarization first and then the $N_k$ ports are indexed within a panel first, a rank 1 precoder w is generated as $w_{p,m,n} = [u_{m,1}, a_p u_{m,2}, \ldots, a_p u_{m,K}, \phi_n u_{m,1}, a_p \phi_n u_{m,2}, \ldots, a_p \phi n_{um,K}]^T$.

In other embodiments, when the polarization co-phasing factor is the same for the multiple antenna panels, when the antenna panel co-phasing factor is the same for the multiple antenna panels, and when the combining weight is the same for the multiple antenna panels; and when the $N_k$ ports are mapped to corresponding antenna elements from one panel first and then within the panel the ports are indexed from one polarization first, a rank 1 precoder w is generated as $w_{p,m,n} = [u_{m,1}, \phi_n u_{m,1}, a_p u_{m,2}, a_p \phi_n u_{m,2} \ldots, a_p u_{m,K}, a_p \phi_n u_{m,K}]^T$.

In other embodiments, when the polarization co-phasing factor is different for the multiple antenna panels, when the antenna panel co-phasing factor is different for the multiple antenna panels, and when the combining weight is different for the multiple antenna panels; and when the $N_k$ ports are mapped to corresponding antenna elements from one polarization first and then the $N_k$ ports are indexed within a panel first, a rank 1 precoder w is generated as $w_{m_1,n_1,m_2,n_2,\ldots,m_K,n_K,p_K} = [u_{m_1,1}, a_{p_2}u_{m_2,2}, \ldots, a_{p_K}u_{m_K,K}, \phi_{n_1}u_{m_1,1}, a_{p_2}\phi_{n_2}u_{m_2,2}, \ldots, a_{p_K}\phi_{n_K}u_{m_K,K}]^T$.

In other embodiments, when the polarization co-phasing factor is different for the multiple antenna panels, when the antenna panel co-phasing factor is different for the multiple antenna panels, and when the combining weight is different for the multiple antenna panels; and when the $N_k$ ports are mapped to corresponding antenna elements from one panel first and then within the panel the ports are indexed from one polarization first, a rank 1 precoder w is generated as $w_{m_1,n_1,m_2,n_2,\ldots,m_K,n_K,p_K} = [u_{m_1,1}, \phi_{n_1}u_{m_1,1}, a_{p_2}u_{m_2,2}, a_{p_2}\phi_{n_2}u_{m_2,2}, \ldots, a_{p_K}u_{m_K,K}, a_{p_K}\phi_{n_K}u_{m_K,K}]^T$.

Certain embodiments of the method 300 further comprise generating a rank 2 precoder by changing the polarization co-phasing factor from $\phi_n$ to $-\phi_n$. The method 300 may further comprise generating additional precoders with a rank greater than 2 based on different values of m, n, and p for every two layers.

Certain embodiments of the method 300 further comprise generating non-coherent or partially coherent precoders with a rank greater than 1 based on at least one of a panel selection and a port selection for each layer. In certain such embodiments, the UE does not support coherent transmission across polarizations; wherein when the polarization co-phasing factor is the same for the multiple antenna panels, when the antenna panel co-phasing factor is the same for the multiple antenna panels, and when the combining weight is the same for the multiple antenna panels; and wherein when the $N_k$ ports are mapped to corresponding antenna elements from one polarization first and then the $N_k$ ports are indexed within a panel first, a first layer of a precoder is generated as: $w_{p,m} = [u_{m,1}, a_p u_{m,2}, \ldots, a_p u_{m,K}, 0, \ldots, 0]^T$; and a second layer of the precoder is generated as: $w_{p',m'} = [0, 0, \ldots, 0, u_{m',1}, a'_p u_{m',2}, \ldots, a'_p u_{m',K}]^T$.

In one embodiment of the method 300, a number of configured sounding reference signal (SRS) resources for SRS switching comprises ceil(y/x) for xTyR, where x represents a number of transmit (T) chains and y represents a number of receive (R) chains corresponding to a combination of downlink and uplink antenna ports in the multiple antenna panels.

Figure 4:
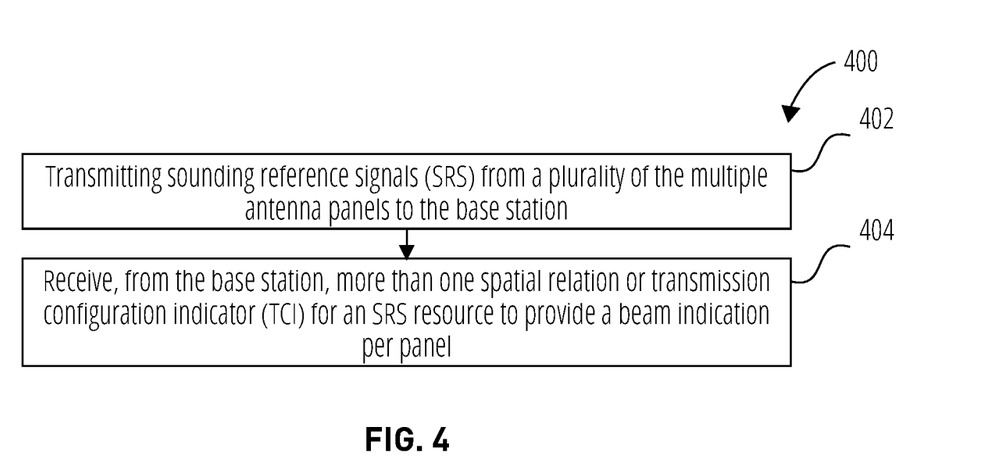
FIG. 4 is a flowchart of a method for a UE in accordance with one embodiment.

FIG. 4 is a flowchart of a method 400 for a UE according to one embodiment. The UE may use the method 400 with, or independent of, the method 300 shown in FIG. 3 or other methods described herein. As shown in FIG. 4, in block 402, the method 400 includes transmitting SRS from a plurality of the multiple antenna panels to the base station. In block 404, the method 400 includes receiving, from the base station, more than one spatial relation or transmission configuration indicator (TCI) for an SRS resource to provide a beam indication per panel.

Figure 5:
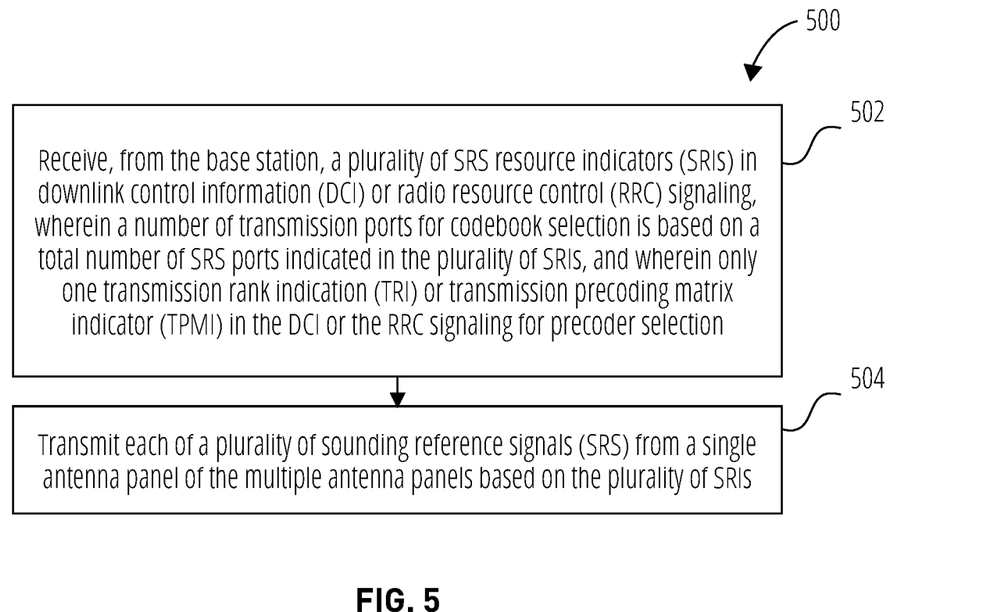
FIG. 5 is a flowchart of a method for a UE in accordance with one embodiment.

FIG. 5 is flowchart of a method 500 for a UE according to one embodiment. The UE may use the method 500 with, or independent of, the method 300 shown in FIG. 3 or other methods described herein. As shown in FIG. 5, in block 502, the method 500 includes receiving, from the base station, a plurality of SRS resource indicators (SRIs) in downlink control information (DCI) or radio resource control (RRC) signaling. A number of transmission ports for codebook selection is based on a total number of SRS ports indicated in the plurality of SRIs. Only one transmission rank indication (TRI) or transmission precoding matrix indicator (TPMI) in the DCI or the RRC signaling for precoder selection. In block 504, the method 500 includes transmitting each of a plurality of sounding reference signals (SRS) from a single antenna panel of the multiple antenna panels based on the plurality of SRIs.

In one embodiment, the method 500 further comprises determining power control parameters for a physical uplink shared channel (PUSCH) based on the plurality of SRIs.

In one embodiment, the method 500 further comprises determining power control parameters for a physical uplink shared channel (PUSCH) configured by the RRC signaling.

In one embodiment, the method 500 further comprises determining power control parameters for a physical uplink shared channel (PUSCH) configured by beam indication signaling.

Embodiments contemplated herein include an apparatus comprising means to perform one or more elements of the method 300, the method 400, and/or the method 500. This apparatus may be, for example, an apparatus of a UE (such as a wireless device 802 that is a UE, as described herein).

Embodiments contemplated herein include one or more non-transitory computer-readable media comprising instructions to cause an electronic device, upon execution of the instructions by one or more processors of the electronic device, to perform one or more elements of the method 300, the method 400, and/or the method 500. This non-transitory computer-readable media may be, for example, a memory of a UE (such as a memory 806 of a wireless device 802 that is a UE, as described herein).

Embodiments contemplated herein include an apparatus comprising logic, modules, or circuitry to perform one or more elements of the method 300, the method 400, and/or the method 500. This apparatus may be, for example, an apparatus of a UE (such as a wireless device 802 that is a UE, as described herein).

Embodiments contemplated herein include an apparatus comprising: one or more processors and one or more computer-readable media comprising instructions that, when executed by the one or more processors, cause the one or more processors to perform one or more elements of the method 300, the method 400, and/or the method 500. This apparatus may be, for example, an apparatus of a UE (such as a wireless device 802 that is a UE, as described herein).

Embodiments contemplated herein include a signal as described in or related to one or more elements of the method 300, the method 400, and/or the method 500.

Embodiments contemplated herein include a computer program or computer program product comprising instructions, wherein execution of the program by a processor is to cause the processor to carry out one or more elements of the method 300, the method 400, and/or the method 500. The processor may be a processor of a UE (such as a processor(s) 804 of a wireless device 802 that is a UE, as described herein). These instructions may be, for example, located in the processor and/or on a memory of the UE (such as a memory 806 of a wireless device 802 that is a UE, as described herein).

Figure 6:
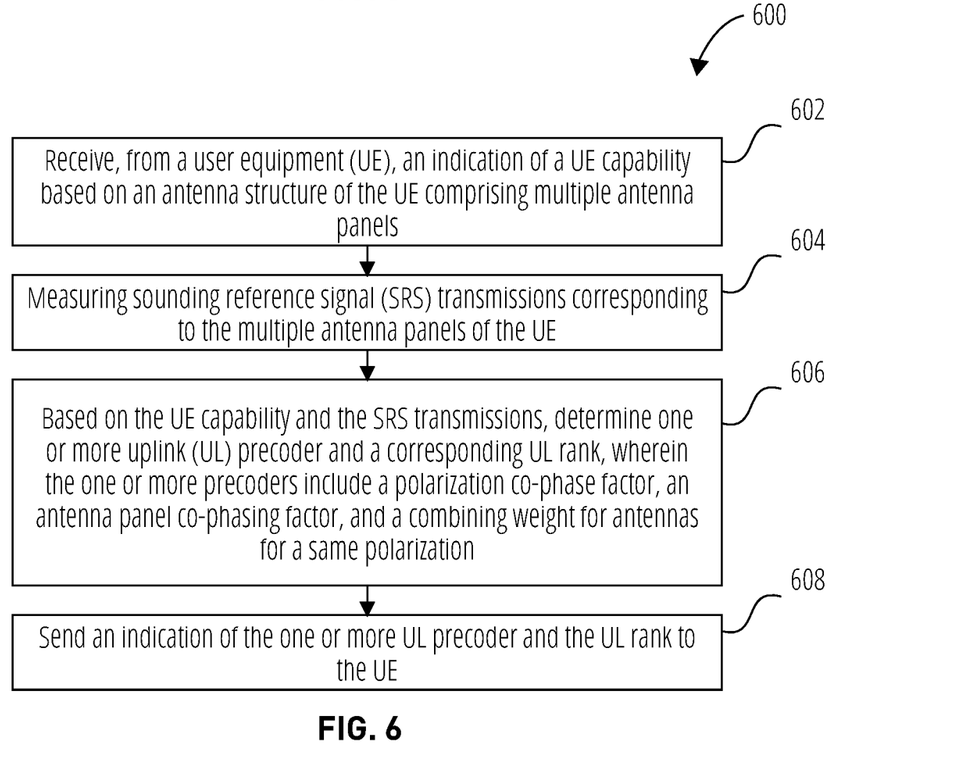
FIG. 6 is a flowchart of a method for a base station in accordance with one embodiment.

FIG. 6 is a flowchart of a method 600 for a base station according to one embodiment. In block 602, the method 600 includes receiving, from a UE, an indication of a UE capability based on an antenna structure of the UE comprising multiple antenna panels. In block 604, the method 600 includes measuring SRS transmissions corresponding to the multiple antenna panels of the UE. In block 606, based on the UE capability and the SRS transmissions, the method 600 includes determining one or more UL precoder and a corresponding UL rank. The one or more UL precoder includes a polarization co-phases factor, an antenna panel co-phasing factor, and a combining weight for antennas for a same polarization. In block 608, the method 600 includes sending an indication of the one or more UL precoder and the UL rank to the UE.

In one embodiment of the method 600, the indication of the UE capability comprises one or more of a preference for a co-phasing for the multiple antenna panels to be the same, a preference for the co-phasing between polarizations for the multiple antenna panels to be the same, and a preference for the combining weight multiple antenna panels to be the same.

In one embodiment of the method 600, the indication of the UE capability indicates whether the UE supports coherent transmission, non-coherent transmission, or partial coherent transmission for each of the multiple antenna panels and across each of the multiple antenna panels. Measuring the SRS transmissions may comprise measuring a reference signal received power (RSRP) of the SRS transmissions from each of the multiple antenna panels to determine a pathloss for power control. The method 600 may further comprise calculating the pathloss using at least one of an average RSRP measured across each of the multiple antenna panels, a minimum RSRP measured across each of the multiple antenna panels, and a maximum RSRP measured across each of the multiple antenna panels. The method 600 may further comprise transmitting, to the UE, more than one spatial relation or transmission configuration indicator (TCI) for an SRS resource to provide a beam indication per panel.

One embodiment of the method 600 further comprises transmitting, to the UE, a plurality of SRS resource indicators (SRIs) in downlink control information (DCI) or radio resource control (RRC) signaling, wherein a number of transmission ports for codebook selection is based on a total number of SRS ports indicated in the plurality of SRIs, and wherein only one transmission rank indication (TRI) or transmission precoding matrix indicator (TPMI) in the DCI or the RRC signaling for precoder selection. The method 600 may further comprise configuring a mapping between the plurality of SRIs and power control parameters for a physical uplink shared channel (PUSCH). Or, the method 600 may further comprise configuring power control parameters for a physical uplink shared channel (PUSCH) using radio resource control (RRC) signaling. Or, the method 600 may further comprise configuring power control parameters for a physical uplink shared channel (PUSCH) using beam indication signaling. The beam indication signaling may comprise a transmission configuration indicator (TCI).

In one embodiment of the method 600, a number of configured SRS resources for SRS switching comprises ceil(y/x) for xTyR, where x represents a number of transmit (T) chains and y represents a number of receive (R) chains corresponding to a combination of downlink and uplink antenna ports in the multiple antenna panels.

Embodiments contemplated herein include an apparatus comprising means to perform one or more elements of the method 600. This apparatus may be, for example, an apparatus of a base station (such as a network device 818 that is a base station, as described herein).

Embodiments contemplated herein include one or more non-transitory computer-readable media comprising instructions to cause an electronic device, upon execution of the instructions by one or more processors of the electronic device, to perform one or more elements of the method 600. This non-transitory computer-readable media may be, for example, a memory of a base station (such as a memory 822 of a network device 818 that is a base station, as described herein).

Embodiments contemplated herein include an apparatus comprising logic, modules, or circuitry to perform one or more elements of the method 600. This apparatus may be, for example, an apparatus of a base station (such as a network device 818 that is a base station, as described herein).

Embodiments contemplated herein include an apparatus comprising: one or more processors and one or more computer-readable media comprising instructions that, when executed by the one or more processors, cause the one or more processors to perform one or more elements of the method 600. This apparatus may be, for example, an apparatus of a base station (such as a network device 818 that is a base station, as described herein).

Embodiments contemplated herein include a signal as described in or related to one or more elements of the method 600.

Embodiments contemplated herein include a computer program or computer program product comprising instructions, wherein execution of the program by a processing element is to cause the processing element to carry out one or more elements of the method 600. The processor may be a processor of a base station (such as a processor(s) 820 of a network device 818 that is a base station, as described herein). These instructions may be, for example, located in the processor and/or on a memory of the base station (such as a memory 822 of a network device 818 that is a base station, as described herein).

Figure 7:
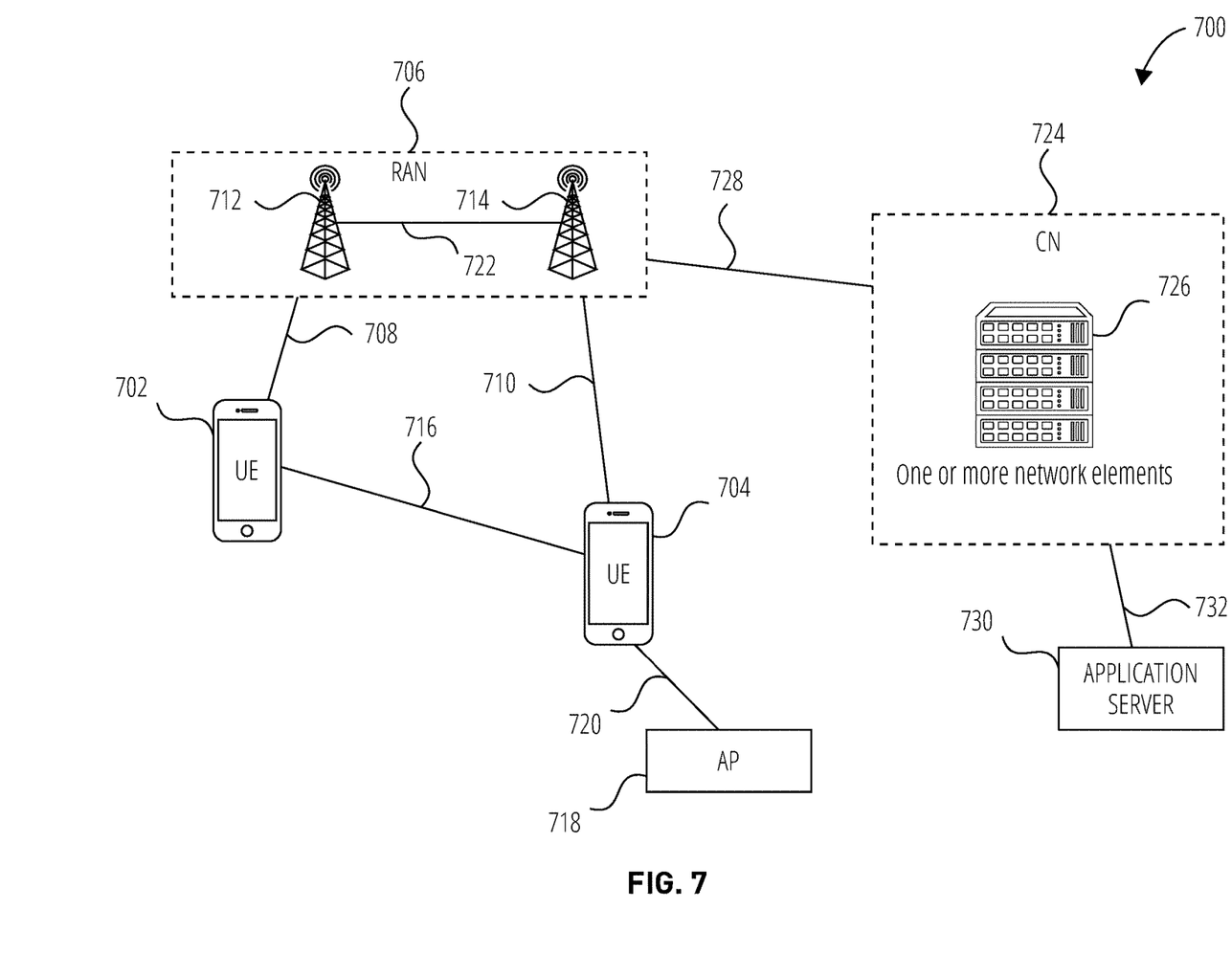
FIG. 7 illustrates an example architecture of a wireless communication system, according to embodiments disclosed herein.

FIG. 7 illustrates an example architecture of a wireless communication system 700, according to embodiments disclosed herein. The following description is provided for an example wireless communication system 700 that operates in conjunction with the LTE system standards and/or 5G or NR system standards as provided by 3GPP technical specifications.

As shown by FIG. 7, the wireless communication system 700 includes UE 702 and UE 704 (although any number of UEs may be used). In this example, the UE 702 and the UE 704 are illustrated as smartphones (e.g., handheld touchscreen mobile computing devices connectable to one or more cellular networks), but may also comprise any mobile or non-mobile computing device configured for wireless communication.

The UE 702 and UE 704 may be configured to communicatively couple with a RAN 706. In embodiments, the RAN 706 may be NG-RAN, E-UTRAN, etc. The UE 702 and UE 704 utilize connections (or channels) (shown as connection 708 and connection 710, respectively) with the RAN 706, each of which comprises a physical communications interface. The RAN 706 can include one or more base stations, such as base station 712 and base station 714, that enable the connection 708 and connection 710.

In this example, the connection 708 and connection 710 are air interfaces to enable such communicative coupling, and may be consistent with RAT(s) used by the RAN 706, such as, for example, an LTE and/or NR.

In some embodiments, the UE 702 and UE 704 may also directly exchange communication data via a sidelink interface 716. The UE 704 is shown to be configured to access an access point (shown as AP 718) via connection 720. By way of example, the connection 720 can comprise a local wireless connection, such as a connection consistent with any IEEE 602.11 protocol, wherein the AP 718 may comprise a Wi-Fi® router. In this example, the AP 718 may be connected to another network (for example, the Internet) without going through a CN 724.

In embodiments, the UE 702 and UE 704 can be configured to communicate using orthogonal frequency division multiplexing (OFDM) communication signals with each other or with the base station 712 and/or the base station 714 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 712 or base station 714 may be implemented as one or more software entities running on server computers as part of a virtual network. In addition, or in other embodiments, the base station 712 or base station 714 may be configured to communicate with one another via interface 722. In embodiments where the wireless communication system 700 is an LTE system (e.g., when the CN 724 is an EPC), the interface 722 may be an X2 interface. The X2 interface may be defined between two or more base stations (e.g., two or more eNBs and the like) that connect to an EPC, and/or between two eNBs connecting to the EPC. In embodiments where the wireless communication system 700 is an NR system (e.g., when CN 724 is a 5GC), the interface 722 may be an Xn interface. The Xn interface is defined between two or more base stations (e.g., two or more gNBs and the like) that connect to 5GC, between a base station 712 (e.g., a gNB) connecting to 5GC and an eNB, and/or between two eNBs connecting to 5GC (e.g., CN 724).

The RAN 706 is shown to be communicatively coupled to the CN 724. The CN 724 may comprise one or more network elements 726, which are configured to offer various data and telecommunications services to customers/subscribers (e.g., users of UE 702 and UE 704) who are connected to the CN 724 via the RAN 706. The components of the CN 724 may be implemented in one physical device or separate physical devices including components to read and execute instructions from a machine-readable or computer-readable medium (e.g., a non-transitory machine-readable storage medium).

In embodiments, the CN 724 may be an EPC, and the RAN 706 may be connected with the CN 724 via an S1 interface 728. In embodiments, the S1 interface 728 may be split into two parts, an S1 user plane (S1-U) interface, which carries traffic data between the base station 712 or base station 714 and a serving gateway (S-GW), and the S1-MME interface, which is a signaling interface between the base station 712 or base station 714 and mobility management entities (MMEs).

In embodiments, the CN 724 may be a 5GC, and the RAN 706 may be connected with the CN 724 via an NG interface 728. In embodiments, the NG interface 728 may be split into two parts, an NG user plane (NG-U) interface, which carries traffic data between the base station 712 or base station 714 and a user plane function (UPF), and the S1 control plane (NG-C) interface, which is a signaling interface between the base station 712 or base station 714 and access and mobility management functions (AMFs).

Generally, an application server 730 may be an element offering applications that use internet protocol (IP) bearer resources with the CN 724 (e.g., packet switched data services). The application server 730 can also be configured to support one or more communication services (e.g., VoIP sessions, group communication sessions, etc.) for the UE 702 and UE 704 via the CN 724. The application server 730 may communicate with the CN 724 through an IP communications interface 732.

Figure 8:
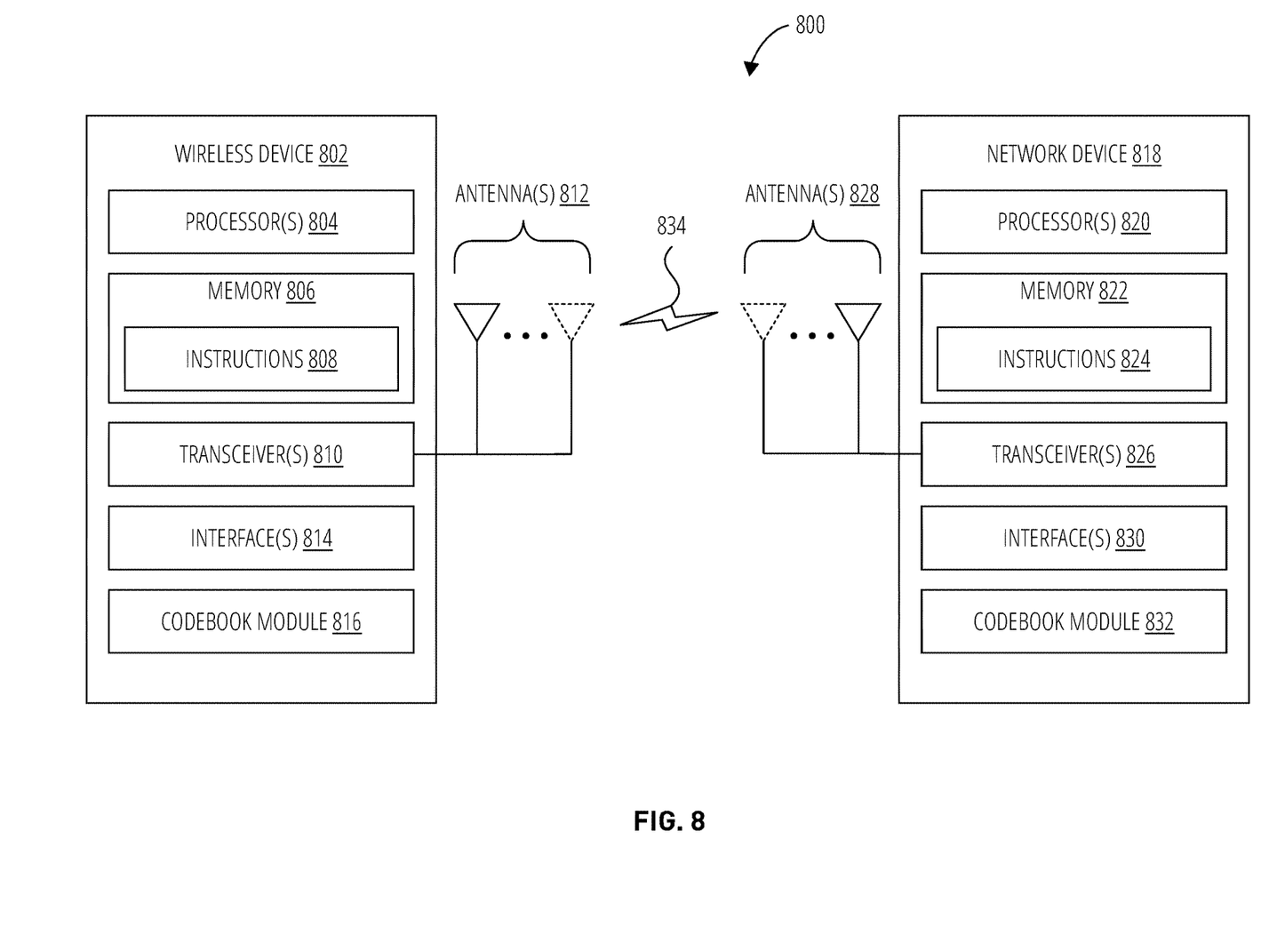
FIG. 8 illustrates a system for performing signaling between a wireless device and a network device, according to embodiments disclosed herein.

FIG. 8 illustrates a system 800 for performing signaling 834 between a wireless device 802 and a network device 818, according to embodiments disclosed herein. The system 800 may be a portion of a wireless communications system as herein described. The wireless device 802 may be, for example, a UE of a wireless communication system. The network device 818 may be, for example, a base station (e.g., an eNB or a gNB) of a wireless communication system.

The wireless device 802 may include one or more processor(s) 804. The processor(s) 804 may execute instructions such that various operations of the wireless device 802 are performed, as described herein. The processor(s) 804 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 802 may include a memory 806. The memory 806 may be a non-transitory computer-readable storage medium that stores instructions 808 (which may include, for example, the instructions being executed by the processor(s) 804). The instructions 808 may also be referred to as program code or a computer program. The memory 806 may also store data used by, and results computed by, the processor(s) 804.

The wireless device 802 may include one or more transceiver(s) 810 that may include radio frequency (RF) transmitter and/or receiver circuitry that use the antenna(s) 812 of the wireless device 802 to facilitate signaling (e.g., the signaling 834) to and/or from the wireless device 802 with other devices (e.g., the network device 818) according to corresponding RAT s.

The wireless device 802 may include one or more antenna(s) 812 (e.g., one, two, four, or more). For embodiments with multiple antenna(s) 812, the wireless device 802 may leverage the spatial diversity of such multiple antenna(s) 812 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 802 may be accomplished according to precoding (or digital beamforming) that is applied at the wireless device 802 that multiplexes the data streams across the antenna(s) 812 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 802 may implement analog beamforming techniques, whereby phases of the signals sent by the antenna(s) 812 are relatively adjusted such that the (joint) transmission of the antenna(s) 812 can be directed (this is sometimes referred to as beam steering).

The wireless device 802 may include one or more interface(s) 814. The interface(s) 814 may be used to provide input to or output from the wireless device 802. For example, a wireless device 802 that is a UE may include interface(s) 814 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 810/antenna(s) 812 already described) that allow for communication between the UE and other devices and may operate according to known protocols (e.g., Wi-Fi®, Bluetooth®, and the like).

The wireless device 802 may include a codebook module 816. The codebook module 816 may be implemented via hardware, software, or combinations thereof. For example, the codebook module 816 may be implemented as a processor, circuit, and/or instructions 808 stored in the memory 806 and executed by the processor(s) 804. In some examples, the codebook module 816 may be integrated within the processor(s) 804 and/or the transceiver(s) 810. For example, the codebook module 816 may be implemented by a combination of software components (e.g., executed by a DSP or a general processor) and hardware components (e.g., logic gates and circuitry) within the processor(s) 804 or the transceiver(s) 810.

The codebook module 816 may be used for various aspects of the present disclosure, for example, aspects of FIG. 3, FIG. 4, and FIG. 5.

The network device 818 may include one or more processor(s) 820. The processor(s) 820 may execute instructions such that various operations of the network device 818 are performed, as described herein. The processor(s) 804 may include one or more baseband processors implemented using, for example, a CPU, a DSP, an ASIC, a controller, an FPGA device, another hardware device, a firmware device, or any combination thereof configured to perform the operations described herein.

The network device 818 may include a memory 822. The memory 822 may be a non-transitory computer-readable storage medium that stores instructions 824 (which may include, for example, the instructions being executed by the processor(s) 820). The instructions 824 may also be referred to as program code or a computer program. The memory 822 may also store data used by, and results computed by, the processor(s) 820.

The network device 818 may include one or more transceiver(s) 826 that may include RF transmitter and/or receiver circuitry that use the antenna(s) 828 of the network device 818 to facilitate signaling (e.g., the signaling 834) to and/or from the network device 818 with other devices (e.g., the wireless device 802) according to corresponding RATs.

The network device 818 may include one or more antenna(s) 828 (e.g., one, two, four, or more). In embodiments having multiple antenna(s) 828, the network device 818 may perform MIMO, digital beamforming, analog beamforming, beam steering, etc., as has been described.

The network device 818 may include one or more interface(s) 830. The interface(s) 830 may be used to provide input to or output from the network device 818. For example, a network device 818 that is a base station may include interface(s) 830 made up of transmitters, receivers, and other circuitry (e.g., other than the transceiver(s) 826/antenna(s) 828 already described) that enables the base station to communicate with other equipment in a core network, and/or that enables the base station to communicate with external networks, computers, databases, and the like for purposes of operations, administration, and maintenance of the base station or other equipment operably connected thereto.

The network device 818 may include a codebook module 832. The codebook module 832 may be implemented via hardware, software, or combinations thereof. For example, the codebook module 832 may be implemented as a processor, circuit, and/or instructions 824 stored in the memory 822 and executed by the processor(s) 820. In some examples, the codebook module 832 may be integrated within the processor(s) 820 and/or the transceiver(s) 826. For example, the codebook module 832 may be implemented by a combination of software components (e.g., executed by a DSP or a general processor) and hardware components (e.g., logic gates and circuitry) within the processor(s) 820 or the transceiver(s) 826.

The codebook module 832 may be used for various aspects of the present disclosure, for example, aspects of FIG. 6.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a base station, the method comprising:
receiving, from a user equipment (UE), an indication of a UE capability based on an antenna structure of the UE comprising multiple antenna panels, wherein the indication of the UE capability indicates whether the UE supports coherent transmission, non-coherent transmission, or partial coherent transmission for each of the multiple antenna panels and across each of the multiple antenna panels;
measuring sounding reference signal (SRS) transmissions corresponding to the multiple antenna panels of the UE, wherein measuring the SRS transmissions comprises measuring a reference signal received power (RSRP) of the SRS transmissions from each of the multiple antenna panels to determine a pathloss for power control;
based on the UE capability and the SRS transmissions, determining one or more uplink (UL) precoders and a corresponding UL rank, wherein the one or more UL precoders includes a polarization co-phasing factor, an antenna panel co-phasing factor, and a combining weight for antennas for a same polarization; and
transmitting an indication of the one or more UL precoders and the UL rank to the UE.

2. The method of claim 1, wherein the indication of the UE capability comprises one or more of a preference for a co-phasing for the multiple antenna panels to be the same, a preference for the co-phasing between polarizations for the multiple antenna panels to be the same, and a preference for the combining weight of the multiple antenna panels to be the same.

3. The method of claim 1, further comprising calculating the pathloss using at least one of an average RSRP measured across each of the multiple antenna panels, a minimum RSRP measured across each of the multiple antenna panels, and a maximum RSRP measured across each of the multiple antenna panels.

4. The method of claim 1, further comprising transmitting, to the UE, a plurality of SRS resource indicators (SRIs) in downlink control information (DCI) or radio resource control (RRC) signaling, wherein a number of transmission ports for codebook selection is based on a total number of SRS ports indicated in the plurality of SRIs, and wherein only one transmission rank indication (TRI) or transmission precoding matrix indicator (TPMI) in the DCI or the RRC signaling for precoder selection.

5. The method of claim 4, further comprising configuring a mapping between the plurality of SRIs and power control parameters for a physical uplink shared channel (PUSCH).

6. The method of claim 4, further comprising configuring power control parameters for a physical uplink shared channel (PUSCH) using the RRC signaling.

7. The method of claim 4, further comprising configuring power control parameters for a physical uplink shared channel (PUSCH) using beam indication signaling.

8. The method of claim 7, wherein the beam indication signaling comprises a transmission configuration indicator (TCI).

9. The method of claim 1, wherein a number of configured SRS resources for SRS switching comprises ceil (y/x) for xTyR, where x represents a number of transmit (T) chains and y represents a number of receive (R) chains corresponding to a combination of downlink and uplink antenna ports in the multiple antenna panels.

10. A non-transitory computer-readable medium comprising instructions that, when executed by one or more processors of a base station, perform a method comprising:
receiving, from a user equipment (UE), an indication of a UE capability based on an antenna structure of the UE comprising multiple antenna panels, wherein the indication of the UE capability indicates whether the UE supports coherent transmission, non-coherent transmission, or partial coherent transmission for each of the multiple antenna panels and across each of the multiple antenna panels;
measuring sounding reference signal (SRS) transmissions corresponding to the multiple antenna panels of the UE, wherein measuring the SRS transmissions comprises measuring a reference signal received power (RSRP) of the SRS transmissions from each of the multiple antenna panels to determine a pathloss for power control;
based on the UE capability and the SRS transmissions, determining one or more uplink (UL) and a corresponding UL rank, wherein the one or more UL precoders includes a polarization co-phasing factor, an antenna panel co-phasing factor, and a combining weight for antennas for a same polarization; and
transmitting an indication of the one or more UL and the UL rank to the UE.

11. The non-transitory computer-readable medium of claim 10, wherein the indication of the UE capability comprises one or more of a preference for a co-phasing for the multiple antenna panels to be the same, a preference for the co-phasing between polarizations for the multiple antenna panels to be the same, and a preference for the combining weight of the multiple antenna panels to be the same.

12. The non-transitory computer-readable medium of claim 10, wherein the method further comprises calculating the pathloss using at least one of an average RSRP measured across each of the multiple antenna panels, a minimum RSRP measured across each of the multiple antenna panels, and a maximum RSRP measured across each of the multiple antenna panels.

13. The non-transitory computer-readable medium of claim 10, wherein the method further comprises transmitting, to the UE, a plurality of SRS resource indicators (SRIs) in downlink control information (DCI) or radio resource control (RRC) signaling, wherein a number of transmission ports for codebook selection is based on a total number of SRS ports indicated in the plurality of SRIs, and wherein only one transmission rank indication (TRI) or transmission precoding matrix indicator (TPMI) in the DCI or the RRC signaling for precoder selection.

14. The non-transitory computer-readable medium of claim 13, wherein the method further comprises configuring a mapping between the plurality of SRIs and power control parameters for a physical uplink shared channel (PUSCH).

* * * * *